US011651600B2

(12) United States Patent
Tomosue et al.

(10) Patent No.: US 11,651,600 B2
(45) Date of Patent: May 16, 2023

(54) DRIVER MONITOR AND METHOD FOR MONITORING DRIVER

(71) Applicant: TOYOTA JIDOSHA KABUSHIKI KAISHA, Toyota (JP)

(72) Inventors: Kazuhiro Tomosue, Tokyo-to (JP); Kenichiroh Hara, Yokohama (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 60 days.

(21) Appl. No.: 17/359,725

(22) Filed: Jun. 28, 2021

(65) Prior Publication Data

US 2022/0004790 A1   Jan. 6, 2022

(30) Foreign Application Priority Data

Jul. 2, 2020   (JP) .............................. JP2020-114941

(51) Int. Cl.
*G06T 7/70* (2017.01)
*G06V 20/59* (2022.01)
*G06V 40/16* (2022.01)

(52) U.S. Cl.
CPC .............. *G06V 20/597* (2022.01); *G06T 7/70* (2017.01); *G06V 40/167* (2022.01); *G06T 2207/30201* (2013.01); *G06T 2207/30268* (2013.01)

(58) Field of Classification Search
CPC ...... G06V 20/597; G06V 40/167; G06T 7/70; G06T 2207/30201; G06T 2207/30268
See application file for complete search history.

(56) References Cited

U.S. PATENT DOCUMENTS

| 2011/0052013 | A1* | 3/2011 | Sasahara | .............. G06V 40/165 |
| | | | | 382/118 |
| 2018/0111551 | A1* | 4/2018 | Suzuki | ................... G06V 20/56 |
| 2019/0065873 | A1* | 2/2019 | Wang | ..................... G06V 20/46 |
| 2019/0138790 | A1 | 5/2019 | Matsumura et al. | |
| 2019/0370579 | A1* | 12/2019 | Sugawara | ............. B60W 50/14 |
| 2020/0034603 | A1* | 1/2020 | Yamada | .................... G06T 7/50 |

FOREIGN PATENT DOCUMENTS

| JP | 5396287 B2 | 1/2014 |
| JP | 2019-083019 A | 5/2019 |
| JP | 2019-087150 A | 6/2019 |
| JP | 6597467 B2 | 10/2019 |

* cited by examiner

*Primary Examiner* — Syed Haider
(74) *Attorney, Agent, or Firm* — Oliff PLC

(57) ABSTRACT

A driver monitor includes a processor configured to detect the orientation and the position of the face of a driver of a vehicle from each of face images obtained by a camera for capturing the driver, update a reference direction of orientations or a reference position of the driver's face, based on orientations or positions of the driver's face detected from face images obtained in a preceding predetermined period, and detect putting a wearable object on or taking a wearable object off the driver's face in each face image. Upon detection of putting on or taking off the wearable object, the processor updates the reference direction or the reference position, based on only orientations or positions of the driver's face detected from face images obtained after the detection.

4 Claims, 5 Drawing Sheets

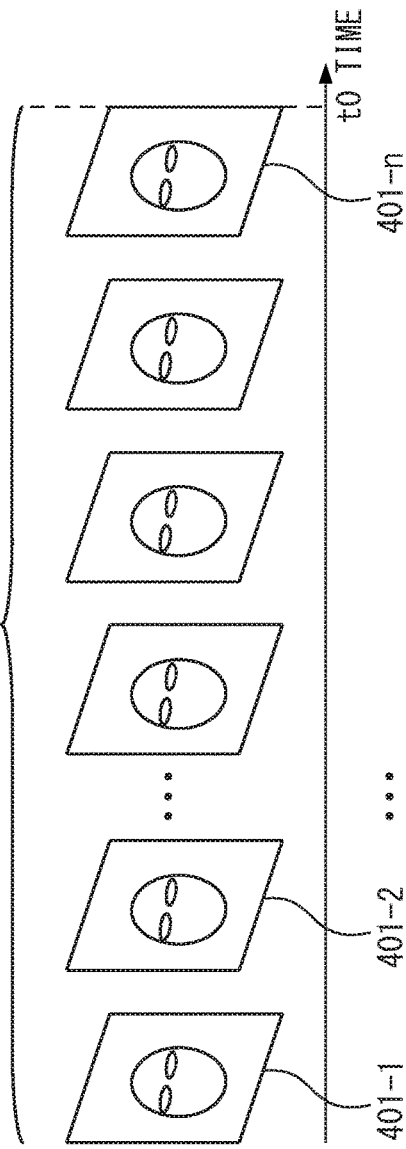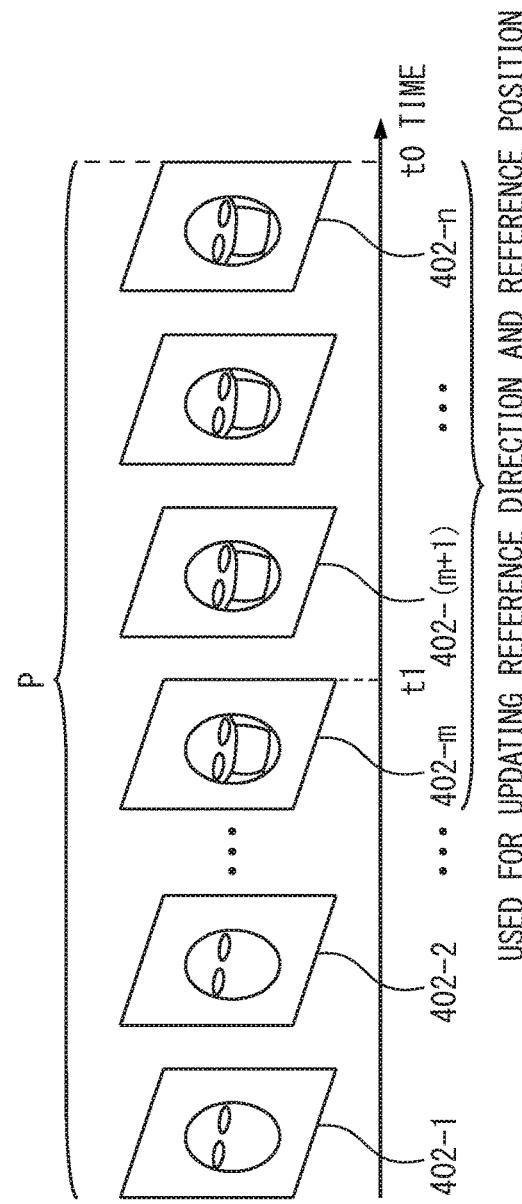

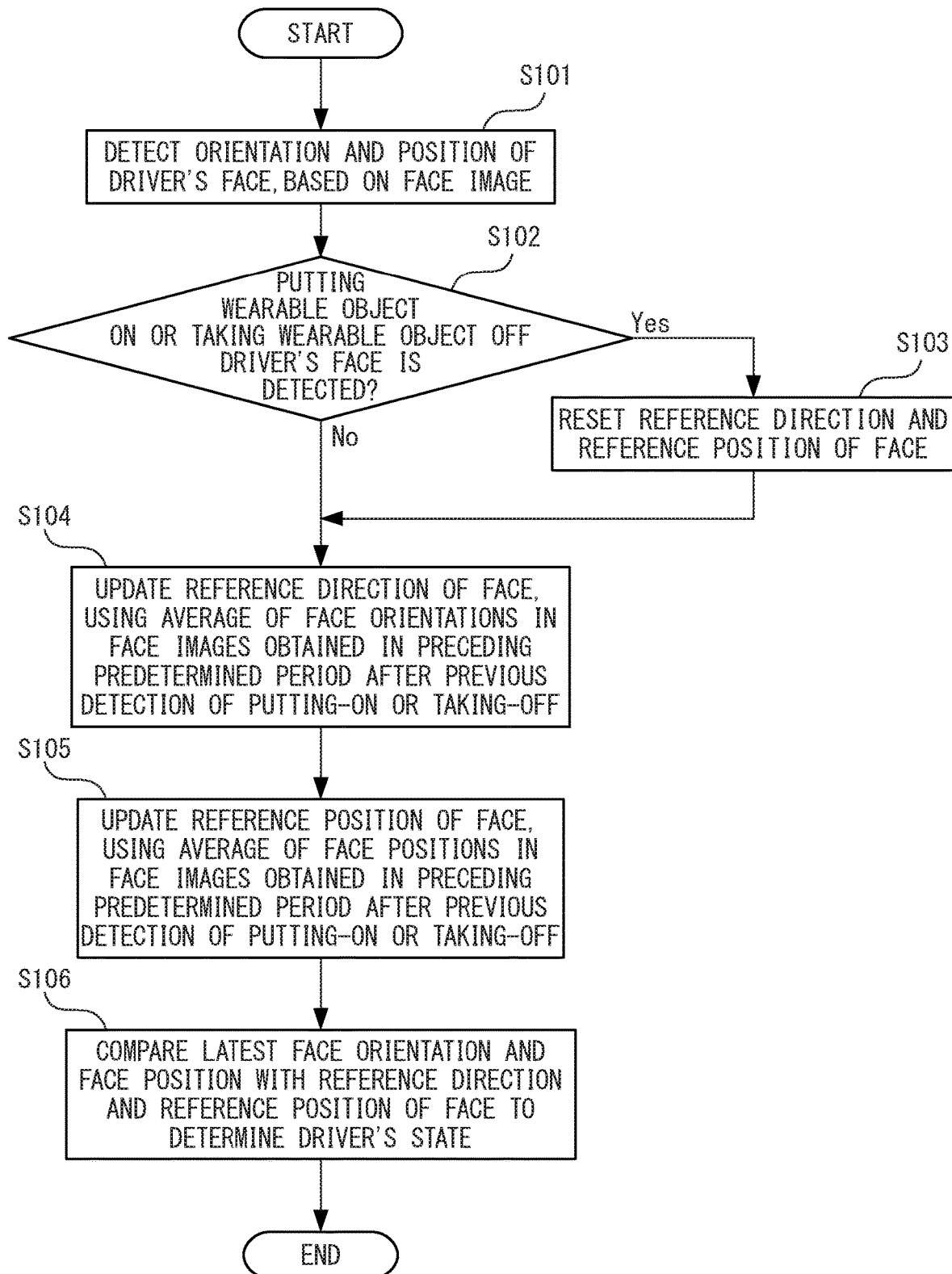

DRIVER MONITOR AND METHOD FOR MONITORING DRIVER

FIELD

The present invention relates to a driver monitor and a method for monitoring a vehicle driver.

BACKGROUND

A technique has been researched to detect the orientation of the face of a driver driving a vehicle, based on an image obtained by capturing the driver, to check the driver's state (see, e.g., Japanese Unexamined Patent Publication No. 2019-87150). For example, a driver monitoring system disclosed in Japanese Unexamined Patent Publication No. 2019-87150 sets a zero point of pitch, yaw, and roll angles of the face of a driver, based on a face orientation angle identified based on a face image captured by an image capturing device when zero-point setting conditions, including a condition that the vehicle speed is not less than a predetermined speed, are satisfied. The driver monitoring system diagnoses the driver's state, based on the current face orientation angle relative to the set zero point.

SUMMARY

The above-described technique diagnoses the driver's state, based on the current orientation of the driver's face relative to a face orientation serving as a reference and set under a predetermined condition. Thus, incorrect detection of the reference orientation of the driver's face may result in erroneous determination of the driver's state, and correct detection of a reference orientation of the face is desired. However, in some cases, a driver may put a wearable object, such as a pair of sunglasses or a mask, on his/her face or take a wearable object which he/she is wearing off the face during travel of a vehicle. In such a case, it may be difficult to correctly determine a reference orientation of the driver's face.

It is an object of the present invention to provide a driver monitor that can correctly set a reference orientation or position of the driver's face even if a wearable object is put on or taken off the driver's face.

According to an embodiment, a driver monitor is provided. The driver monitor includes a processor configured to: detect the orientation and the position of the face of a driver of a vehicle from each of time-series face images representing the driver's face, the face images being obtained by a camera for capturing the driver, the camera being mounted on the vehicle, update a reference direction of orientations of the driver's face, based on orientations of the driver's face respectively detected from face images obtained in a preceding predetermined period among the time-series face images, or update a reference position of the driver's face, based on positions of the driver's face respectively detected from face images obtained in the predetermined period, and detect putting a wearable object on the driver's face or taking a wearable object off the driver's face in each of the time-series face images. Upon detection of putting on or taking off the wearable object, the processor updates the reference direction, based on only orientations of the driver's face detected from face images obtained after the detection, or updates the reference position, based on only positions of the driver's face detected from face images obtained after the detection.

The driver monitor preferably further includes a memory. The processor preferably stores, upon detection of putting the wearable object on the driver's face, a first reference direction or a first reference position of the driver's face at detection of putting on the wearable object in the memory, and sets, upon subsequent detection of taking the wearable object off the driver's face, the first reference direction or the first reference position stored in the memory as the reference direction or the reference position of the driver's face at detection of taking off the wearable object.

According to another embodiment, a method for monitoring a driver is provided. The method includes detecting the orientation and the position of the face of a driver of a vehicle from each of time-series face images representing the driver's face, the face images being obtained by a camera for capturing the driver, the camera being mounted on the vehicle; updating a reference direction of orientations of the driver's face, based on orientations of the driver's face respectively detected from face images obtained in a preceding predetermined period among the time-series face images, or updating a reference position of the driver's face, based on positions of the driver's face respectively detected from face images obtained in the predetermined period; and detecting putting a wearable object on the driver's face or taking a wearable object off the driver's face in each of the time-series face images. The updating of the reference direction or the reference position of the driver's face includes updating, upon detection of putting the wearable object on or taking the wearable object off the driver's face, the reference direction, based on only orientations of the driver's face detected from face images obtained after the detection among the time-series face images, or updating the reference position, based on only positions of the driver's face detected from face images obtained after the detection.

The driver monitor according to the present invention has an advantageous effect of being able to correctly set a reference orientation or position of the driver's face even if a wearable object is put on or taken off the driver's face.

BRIEF DESCRIPTION OF DRAWINGS

FIG. 4A illustrates an example of detection of a reference direction and a reference position for the case that a wearable object is not put on nor taken off the driver's face in a preceding predetermined period.

FIG. 4B illustrates an example of detection of a reference direction and a reference position for the case that putting or taking a wearable object on or off the driver's face is detected in a preceding predetermined period.

FIG. 5 is an operation flowchart of the driver monitoring process.

DESCRIPTION OF EMBODIMENTS

Hereinafter, a driver monitor will be described with reference to the accompanying drawings. The driver monitor detects the orientation and the position of the face of a driver from each of time-series images obtained by a camera provided to capture the driver (hereafter, these images will be referred to as "face images" for convenience of description). The driver monitor then determines the driver's state, based on the angle of a detected face orientation relative to a reference direction of orientations of the face or the amount of displacement of a detected face position from a reference position of the face. To this end, the driver monitor updates the reference direction of the driver's face, based on orientations of the driver's face respectively detected from face images obtained in a preceding predetermined period, or updates the reference position of the driver's face, based on positions of the driver's face respectively detected from face images obtained in the predetermined period. However, when putting a wearable object on or taking a wearable object off the driver's face is detected in any of the face images, the driver monitor temporarily resets the reference direction and the reference position of the face. The driver monitor then updates the reference direction and the reference position of the face, using only face orientations and face positions detected from face images, of the face images obtained in the predetermined period, obtained after the detection of putting on or taking off the wearable object. In this way, the driver monitor eliminates the effect of putting a wearable object on or taking a wearable object off the driver's face at updating the reference direction and the reference position of the face, enabling correctly setting the reference direction and the reference position of the face even if a wearable object is put on or taken off the driver's face.

Figure 1:
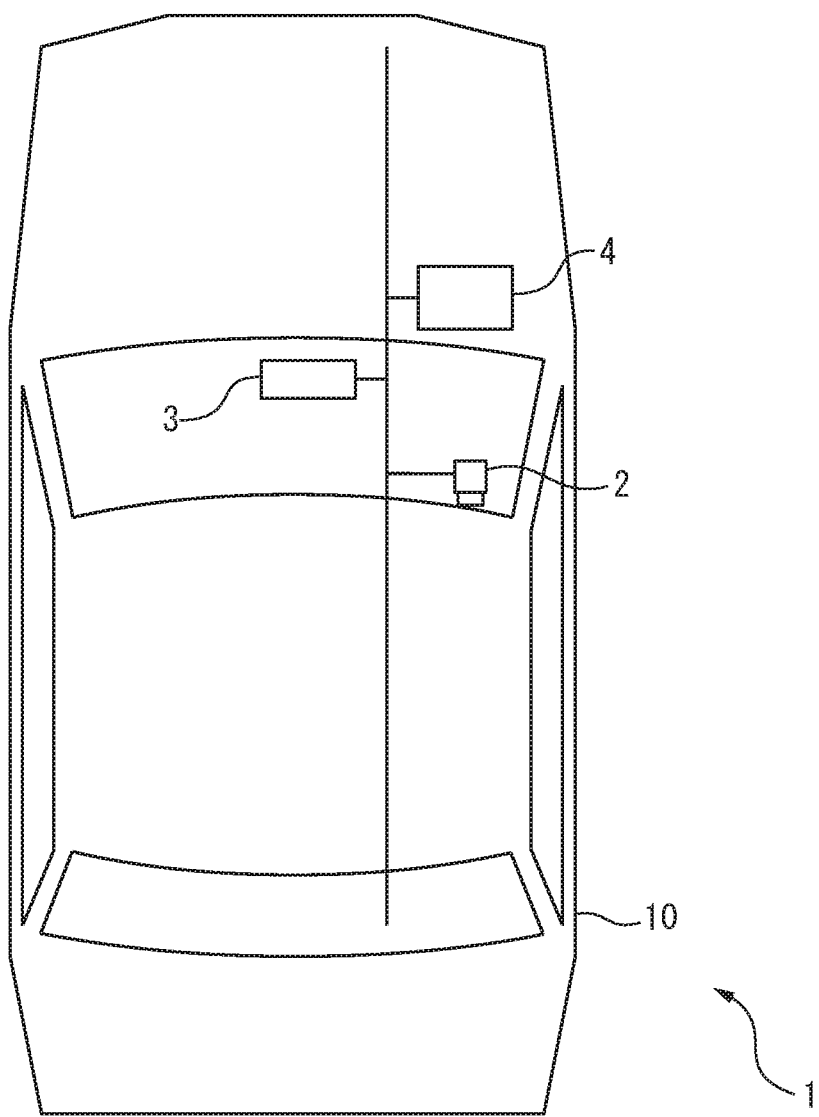
FIG. 1 schematically illustrates the configuration of a vehicle control system including a driver monitor.
Figure 2:
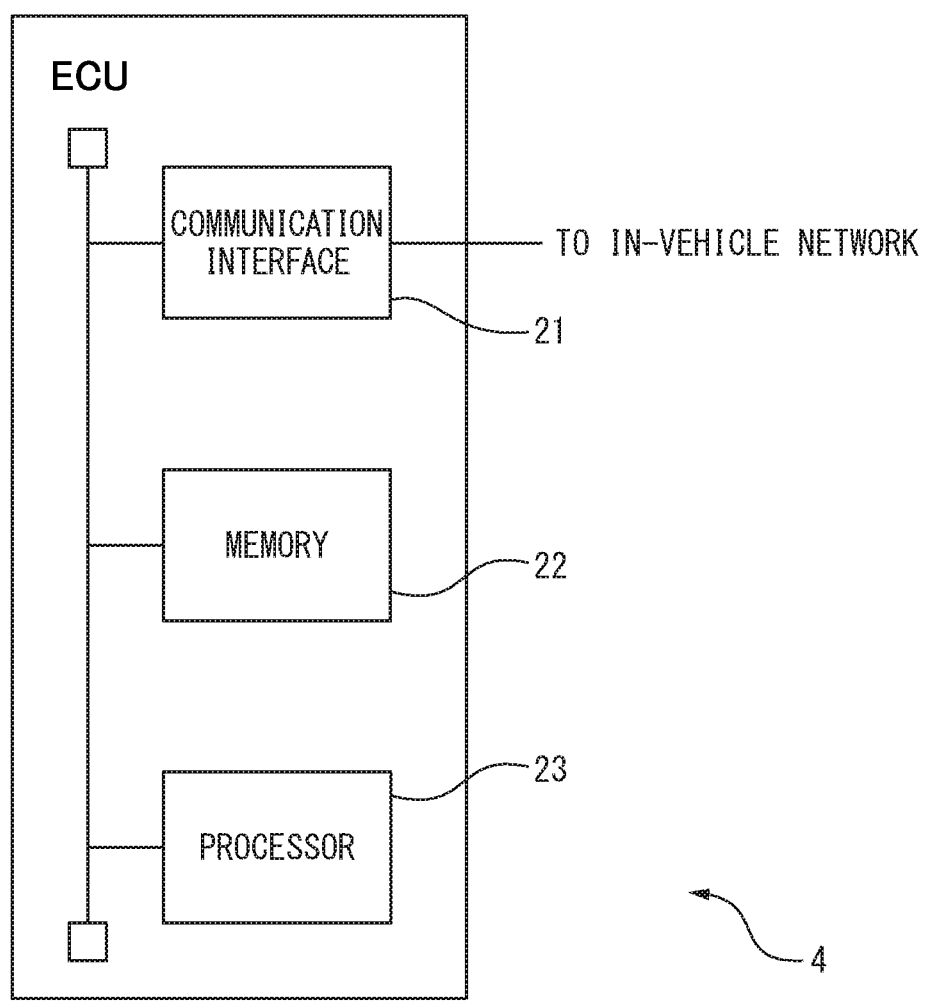
FIG. 2 illustrates the hardware configuration of an electronic control unit, which is an embodiment of the driver monitor.

FIG. 1 schematically illustrates the configuration of a vehicle control system including a driver monitor. FIG. 2 illustrates the hardware configuration of an electronic control unit, which is an embodiment of the driver monitor. In the present embodiment, a vehicle control system 1, which is mounted on a vehicle 10 and controls the vehicle 10, includes a driver monitoring camera 2, a user interface 3, and an electronic control unit (ECU) 4, which is an example of the driver monitor. The driver monitoring camera 2 and the user interface 3 are connected to the ECU 4 via an in-vehicle network conforming to a standard, such as a controller area network, so that they can communicate with each other. The vehicle control system 1 may further include a GPS receiver (not illustrated) for measuring the location of the vehicle 10. The vehicle control system 1 may further include at least one of a camera (not illustrated) for capturing surroundings of the vehicle 10 and a distance sensor (not illustrated), such as LiDAR or radar, which measures the distance from the vehicle 10 to an object around the vehicle 10. The vehicle control system 1 may further include a wireless communication terminal (not illustrated) for wireless communication with another device. The vehicle control system 1 may further include a navigation device (not illustrated) for searching for a travel route of the vehicle 10.

The driver monitoring camera 2, which is an example of a camera or an in-vehicle image capturing unit, includes a two-dimensional detector constructed from an array of optoelectronic transducers, such as CCD or C-MOS, having sensitivity to visible or infrared light and a focusing optical system focusing an image of a target region on the two-dimensional detector. The driver monitoring camera 2 may further include a light source, such as an infrared LED, for illuminating the driver. The driver monitoring camera 2 is mounted, for example, on or near an instrument panel and oriented to the driver so that the head of the driver sitting on the driver's seat of the vehicle 10 may be included in the target region of capturing, i.e., so that it can capture images of the driver's head. The driver monitoring camera 2 captures the driver's head every predetermined capturing period (e.g., $1/30$ to $1/10$ seconds) and generates face images in which at least part of the driver's head is represented. The face images obtained by the driver monitoring camera 2 may be color or gray images. Every time the driver monitoring camera 2 generates a face image, the driver monitoring camera 2 outputs the generated face image to the ECU 4 via the in-vehicle network.

The user interface 3, which is an example of a notifying unit, includes, for example, a display, such as a liquid crystal display or an organic electroluminescent display. The user interface 3 is mounted in the interior of the vehicle 10, e.g., on the instrument panel, so as to be oriented to the driver. The user interface 3 displays various types of information received from the ECU 4 via the in-vehicle network to notify the driver of the information. The user interface 3 may further include a speaker mounted in the interior of the vehicle. In this case, the user interface 3 outputs, in the form of a voice signal, various types of information received from the ECU 4 via the in-vehicle network to notify the driver of the information.

The ECU 4 detects the orientation or the position of the driver's face, based on a face image, and determines the driver's state, based on the orientation or the position of the face. When the driver is in the state unsuitable for driving, e.g., when the driver is looking away, the ECU 4 warns the driver via the user interface 3.

As illustrated in FIG. 2, the ECU 4 includes a communication interface 21, a memory 22, and a processor 23. The communication interface 21, the memory 22, and the processor 23 may be separate circuits or a single integrated circuit.

The communication interface 21 includes an interface circuit for connecting the ECU 4 to the in-vehicle network. Every time it receives a face image from the driver monitoring camera 2, the communication interface 21 passes the received face image to the processor 23. When it receives information to be displayed on the user interface 3 from the processor 23, the communication interface 21 outputs this information to the user interface 3.

The memory 22, which is an example of a storage unit, includes, for example, volatile and nonvolatile semiconductor memories. The memory 22 stores various algorithms and various types of data used in a driver monitoring process executed by the processor 23 of the ECU 4. For example, the memory 22 stores face images and various parameters used for detecting parts of the driver's face from a face image and determining the orientation of the face. Additionally, the memory 22 temporarily stores various types of data generated during the driver monitoring process.

The processor 23 includes one or more central processing units (CPUs) and a peripheral circuit thereof. The processor 23 may further include another operating circuit, such as a logic-arithmetic unit, an arithmetic unit, or a graphics processing unit. The processor 23 executes the driver monitoring process.

Figure 3:
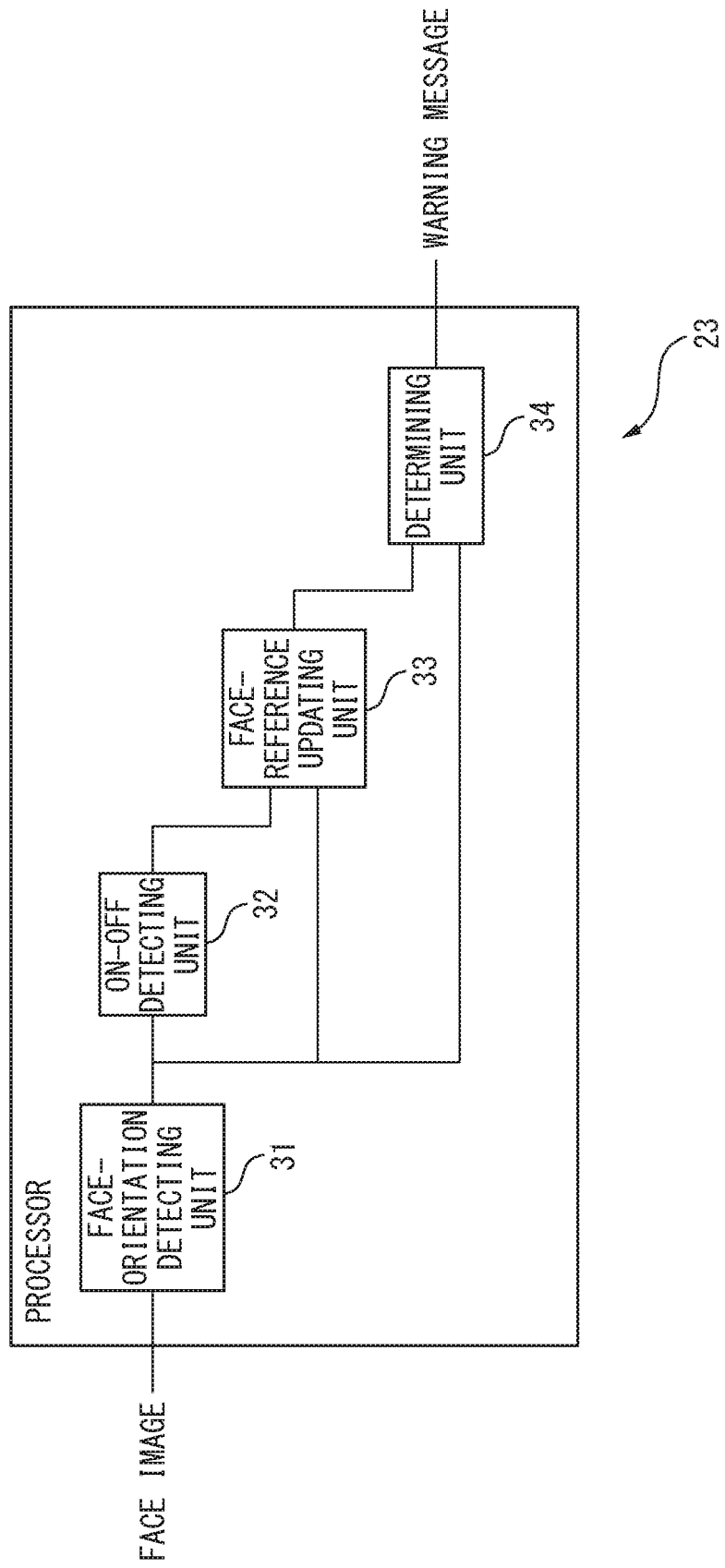
FIG. 3 is a functional block diagram of a processor of the electronic control unit, related to a driver monitoring process.

FIG. 3 is a functional block diagram of the processor 23, related to the driver monitoring process. The processor 23 includes a face-orientation detecting unit 31, an on-off detecting unit 32, a face-reference updating unit 33, and a determining unit 34. These units included in the processor 23 are, for example, functional modules implemented by a computer program executed on the processor 23, or may be dedicated operating circuits provided in the processor 23.

Every time the ECU 4 receives a face image from the driver monitoring camera 2, the face-orientation detecting unit 31 detects the orientation of the driver's face, based on the received face image.

For example, the face-orientation detecting unit 31 inputs each face image into a classifier that has been trained to detect the face of a driver from an image, thereby detecting a region in the face image representing the driver's face (hereafter, a "face region"). As such a classifier, the face-orientation detecting unit 31 may use, for example, a deep neural network (DNN) having a convolutional neural network (CNN) architecture, such as a Single Shot MultiBox Detector (SSD) or a Faster R-CNN. Alternatively, the face-orientation detecting unit 31 may use an AdaBoost classifier as such a classifier. The classifier is trained in advance in accordance with a predetermined training technique, using training data including images that represent faces and images that do not represent faces. A set of parameters specifying the classifier may be prestored in the memory 22. The face-orientation detecting unit 31 may detect a face region from a face image in accordance with another technique to detect a face region from an image.

The face-orientation detecting unit 31 detects characteristic points of the driver's face, such as the inner corners and outer corners of the eyes, the tip of the nose, and the corners of the mouth, from the face region of each face image. In this case also, the face-orientation detecting unit 31 can detect the facial characteristic points, for example, by inputting the face region into a classifier that has been trained to detect characteristic points of a face represented in an image. As such a classifier, the face-orientation detecting unit 31 may use, for example, a DNN having a CNN architecture or an AdaBoost classifier. The classifier for detecting a face region may be trained in advance to detect not only a face region but also facial characteristic points. In this case, the face-orientation detecting unit 31 can detect facial characteristic points together with a face region by inputting a face image into the classifier. Alternatively, the face-orientation detecting unit 31 may detect characteristic points of the driver's face from a face region by means of template matching of the face region with templates representing facial characteristic points or in accordance with another technique to detect facial characteristic points.

The face-orientation detecting unit 31 fits the detected facial characteristic points into a three-dimensional face model representing the three-dimensional shape of a face. The face-orientation detecting unit 31 then detects, as the orientation of the driver's face, that of the face of the three-dimensional face model that the characteristic points best fit. The orientation of the driver's face is expressed, for example, as a combination of pitch, yaw, and roll angles with respect to the direction toward the driver monitoring camera 2. At this detection, the face-orientation detecting unit 31 may use different three-dimensional face models for the cases that a wearable object is put on the face and that there is no wearable object, based on the result of determination of putting a wearable object on or taking a wearable object off the driver's face, based on previously obtained face images. More specifically, after it is determined that a wearable object is taken off the face, the face-orientation detecting unit 31 may detect the orientation of the driver's face, using a three-dimensional face model for the case that there is no wearable object on the face. After it is determined that a wearable object is put on the face, the face-orientation detecting unit 31 may detect the orientation of the driver's face, using a three-dimensional face model for the case that a wearable is put on the face.

The face-orientation detecting unit 31 may detect the orientation of the driver's face, based on a face image, in accordance with another technique to determine the orientation of a face represented in an image. For example, the face-orientation detecting unit 31 may detect the orientation of the driver's face, based on the positional relationship between facial characteristic points, as described in the prior art document (Japanese Unexamined Patent Publication No. 2019-87150). In this case, the face-orientation detecting unit 31 may detect, for example, an intersection point between a line connecting the left and right outer corners of the eyes and a perpendicular line from the tip of the nose to the line connecting the left and right outer corners of the eyes. Then, the face-orientation detecting unit 31 may detect the orientation of the driver's face (pitch, yaw, and roll angles), based on the ratio of the distance from the intersection point to the tip of the nose to the distance between the left and right outer corners of the eyes, the ratio of the distance from the intersection point to the right outer corner of the eyes to the distance from the intersection point to the left outer corner of the eyes, and the inclination of the line connecting the left and right outer corners of the eyes with respect to the horizontal line in the image. Alternatively, the face-orientation detecting unit 31 may detect, as the median line of the face, the line connecting the midpoint between the left and right outer corners of the eyes or between the left and right inner corners of the eyes and the midpoint between the left and right corners of the mouth, and detect the orientation of the driver's face, based on the positional relationship between the median line of the face and the tip of the nose. Alternatively, the face-orientation detecting unit 31 may input a face image into a classifier that has been trained to detect the orientation of the face of a driver, thereby detecting the orientation of the driver's face. As such a classifier, the face-orientation detecting unit 31 may use, for example, a DNN having a CNN architecture.

The face-orientation detecting unit 31 may switch the technique applied to detect the orientation of the driver's face, based on the result of determination of putting a wearable object on or taking a wearable object off the driver's face, based on previously obtained face images. For example, after it is determined that a wearable object is taken off the face, the face-orientation detecting unit 31 may detect the orientation of the driver's face by fitting facial characteristic points into a three-dimensional face model or based on the positional relationship between facial characteristic points as described above. After it is determined that a wearable object is put on the face, the face-orientation detecting unit 31 may input a face image into a classifier to detect the orientation of the driver's face.

Additionally, every time the ECU 4 receives a face image from the driver monitoring camera 2, the face-orientation detecting unit 31 detects the position of the driver's face, based on the received face image. For example, the face-orientation detecting unit 31 detects the position of the driver's face, based on detected predetermined facial characteristic points. For example, the face-orientation detecting unit 31 detects, as the position of the face, the position of the midpoint between the left and right inner corners of the eyes, that of the tip of the nose, or that of the centroid of the facial characteristic points. Alternatively, the face-orientation detecting unit 31 may detect the position of the centroid of the face region as the position of the face. The face-orientation detecting unit 31 may switch the technique applied to detect the position of the driver's face, based on the result of determination of putting a wearable object on or taking a wearable object off the driver's face, based on previously obtained face images. For example, after it is determined that a wearable object is taken off the face, the face-orientation detecting unit 31 may detect the position of the centroid of the facial characteristic points as the position of the driver's face. After it is determined that a wearable object is put on the face, the face-orientation detecting unit 31 may detect the centroid of the face region as the position of the driver's face.

The face-orientation detecting unit 31 need not detect the orientation and the position of the driver's face for all face images received from the driver monitoring camera 2, and may detect, every time it receives a predetermined number of face images from the driver monitoring camera 2, the orientation and the position of the driver's face from any one of these face images. Alternatively, the face-orientation detecting unit 31 may detect the orientation and the position of the driver's face only from face images obtained when the vehicle 10 or the driver is in a predetermined situation. For example, the face-orientation detecting unit 31 may detect the orientation and the position of the driver's face only from face images obtained when the speed of the vehicle 10 is not less than a predetermined speed. In other words, the time-series face images from which the orientation and the position of the face are detected may include only some images of the face images obtained by the driver monitoring camera 2.

Every time the face-orientation detecting unit 31 detects the orientation and the position of the driver's face, the face-orientation detecting unit 31 outputs information indicating the detected orientation and position of the face to the face-reference updating unit 33 and the determining unit 34. Additionally, every time the ECU 4 obtains a face image from the driver monitoring camera 2, the face-orientation detecting unit 31 outputs information indicating the facial characteristic points and the face region detected from the face image to the on-off detecting unit 32.

Every time it receives information indicating the detected face characteristic points and face region from the face-orientation detecting unit 31, the on-off detecting unit 32 determines whether a wearable object, such as a pair of sunglasses or a mask, is put on the driver's face and whether a wearable object is taken off the driver's face.

For example, once the driver puts on sunglasses, characteristic points of the eyes (e.g., the inner or outer corners of the eyes) that were detected until the putting-on become undetected after the putting-on. Similarly, once the driver puts on a mask, characteristic points of the mouth or the nose (e.g., the corners of the mouth or the tip of the nose) that were detected until the putting-on become undetected after the putting-on. Conversely, once the driver takes off sunglasses, characteristic points of the eyes that were not detected until the taking-off become detected after the taking-off. Similarly, once the driver takes off a mask, characteristic points of the mouth that were not detected until the taking-off become detected after the taking-off.

Thus, the on-off detecting unit 32 detects putting a wearable object on the face in the case that characteristic points of a predetermined part of the face (e.g., the eyes, mouth, or nose) are detected in the preceding face image and are not detected in the latest face image. Conversely, the on-off detecting unit 32 detects taking a wearable object off the face in the case that characteristic points of a predetermined part of the face are not detected in the preceding face image and are detected in the latest face image. In the case that the types and number of characteristic points detected from the preceding face image are the same as those of characteristic points detected from the latest face image, the on-off detecting unit 32 determines that a wearable object has not been put on nor taken off the driver's face.

When sunglasses having the function of cutting infrared rays are put on the driver's face, infrared light from an infrared light source that is an illuminating light source is absorbed by the sunglasses, causing regions in a face image corresponding to the sunglasses to be filled with black. When a mask is put on the driver's face, infrared light is reflected by the mask, causing a region in a face image corresponding to the mask to be filled with white.

In view of this, according to a modified example, every time it receives information indicating a face region, the on-off detecting unit 32 determines whether the face region in a face image includes a black-filled region having a luminance not greater than a predetermined black-filled threshold or a white-filled region having a luminance not less than a predetermined white-filled threshold. Then, the on-off detecting unit 32 may detect putting a wearable object on the face in the case that neither a black-filled region nor a white-filled region is included in the face region of the preceding face image and that a black-filled region or a white-filled region is detected in the face region of the latest face image. The on-off detecting unit 32 may detect taking a wearable object off the face in the case that a black-filled region or a white-filled region is included in the face region of the preceding face image and that neither a black-filled region nor a white-filled region is detected in the face region of the latest face image. In this case, for example, the on-off detecting unit 32 divides the face region into sub-regions, calculates average luminances of the respective sub-regions, and compares the average luminances of the sub-regions with the black-filled threshold, which corresponds to a black fill, and the white-filled threshold, which corresponds to a white fill. Then, when the average luminance of a sub-region is not greater than the black-filled threshold, the on-off detecting unit 32 may determine that the sub-region is a black-filled region. When the average luminance of a sub-region is not less than the white-filled threshold, the on-off detecting unit 32 may determine that the sub-region is a white-filled region. Since it is inconceivable to wear sunglasses on a lower part of the face and to cover the eyes with a mask during driving, the on-off detecting unit 32 need not check the luminance of every sub-region in the face region, and may compare, for example, only the average luminances of sub-regions near the center of the face region with the black-filled threshold to determine whether these sub-regions are black-filled regions. Additionally, the on-off detecting unit 32 may compare only the average luminances of sub-regions in a lower part of the face region (e.g., the lower half of the face region or approximately one-third of the face region from the bottom thereof) with the white-filled threshold to determine whether these sub-regions are white-filled regions.

Every time the on-off detecting unit 32 detects putting a wearable object on the driver's face, the on-off detecting unit 32 notifies this detection to the face-orientation detecting unit 31 and the face-reference updating unit 33. Similarly, every time the on-off detecting unit 32 detects taking a wearable object off the driver's face, the on-off detecting unit 32 notifies this detection to the face-orientation detecting unit 31 and the face-reference updating unit 33. In the following description, detection of putting a wearable object on the driver's face and detection of taking a wearable object off the driver's face may be collectively referred to as detection of putting a wearable object on or taking a wearable object off the driver's face.

The face-reference updating unit 33 updates the reference direction of the driver's face, based on orientations of the driver's face respectively detected from time-series face images obtained in a preceding predetermined period (e.g., several tens of seconds to one minute). The face-reference updating unit 33 also updates the reference position of the driver's face, based on positions of the driver's face respectively detected from the face images obtained in the predetermined period. However, when notified of detection of putting a wearable object on or taking a wearable object off the driver's face in the predetermined period from the on-off detecting unit 32, the face-reference updating unit 33 updates the reference direction and the reference position, based on orientations and positions of the driver's face detected based on face images obtained after the detection among the face images obtained in the predetermined period.

While driving the vehicle 10, the driver checks left and right as necessary or checks behind through a rearview mirror in some cases, but is supposed to basically look in the travel direction of the vehicle 10, i.e., ahead of the vehicle 10. For this reason, it is supposed that the driver's face is oriented in the travel direction of the vehicle 10 in most cases. Thus, the face-reference updating unit 33 calculates the average of orientations of the driver's face respectively detected from the time-series face images obtained in the predetermined period as the reference direction of the driver's face. Therefore the reference direction of the driver's face corresponds to the orientation of the driver's face for the case that the driver is looking in the travel direction of the vehicle 10. Calculating the average of face orientations in the predetermined period as the reference direction as described above enables the face-reference updating unit 33 to always calculate a correct reference direction even if, for example, a change in the driver's posture during driving varies the position of the driver's head relative to the driver monitoring camera 2.

However, as described above, when notified of detection of putting a wearable object on or taking a wearable object off the driver's face in the predetermined period from the on-off detecting unit 32, the face-reference updating unit 33 temporarily resets the previously determined reference direction of the face. Then, the face-reference updating unit 33 sets the average of orientations of the driver's face respectively detected from face images obtained after the detection among the face images obtained in the predetermined period as the reference direction of the driver's face. Putting a wearable object on or taking a wearable object off the driver's face may cause facial characteristic points represented in a face image before the putting-on or taking-off not to be represented in a face image after the putting-on or taking-off or vice versa. For this reason, the result of detection of a face orientation by the face-orientation detecting unit 31 may change before and after putting a wearable object on or taking a wearable object off the driver's face even if the orientation of the driver's face is not actually changed. Using only face orientations obtained from face images obtained after detection of putting a wearable object on or taking a wearable object off the driver's face for calculating the reference direction of the face as described above enables the face-reference updating unit 33 to calculate an appropriate reference direction depending on the latest state of wearing a wearable object on the driver's face.

Similarly, the face-reference updating unit 33 calculates the average of positions of the driver's face respectively detected from the time-series face images obtained in the predetermined period as the reference position of the driver's face. However, when notified of detection of putting a wearable object on or taking a wearable object off the driver's face in the predetermined period from the on-off detecting unit 32, the face-reference updating unit 33 temporarily resets the previously determined reference position of the face. Then, the face-reference updating unit 33 sets the average of positions of the driver's face respectively detected from face images obtained after the detection among the face images obtained in the predetermined period as the reference position of the driver's face.

As described above, while driving the vehicle 10, the driver may look other than ahead of the vehicle 10 to check surroundings of the vehicle 10. Thus, the face-reference updating unit 33 sets the reference direction of the face temporarily calculated as described above as a temporary reference direction. Then, for each of the face images used for calculating the temporary reference direction, the face-reference updating unit 33 may calculate the absolute value of the difference between the face orientation detected from the face image and the temporary reference direction, and omit to use a face image for which the absolute value of this difference is beyond a predetermined tolerable range for calculating the reference direction. In other words, the face-reference updating unit 33 may exclude face images that will not be used for calculating the reference direction from the face images used for calculating the temporary reference direction, and calculate anew the average of orientations of the driver's face respectively detected from the remaining face images as the reference direction of the driver's face.

Similarly, the face-reference updating unit 33 sets the reference position of the face temporarily calculated as described above as a temporary reference position. Then, for each of the face images used for calculating the temporary reference position, the face-reference updating unit 33 may calculate the absolute value of the difference between the face position detected from the face image and the temporary reference position, and omit to use a face image for which the absolute value of this difference is beyond a predetermined tolerable range for calculating the reference position. In other words, the face-reference updating unit 33 may exclude face images that will not be used for calculating the reference position from the face images used for calculating the temporary reference position, and calculate anew the average of positions of the driver's face respectively detected from the remaining face images as the reference position of the driver's face.

FIG. 4A illustrates an example of detection of the reference direction and the reference position for the case that a wearable object is not put on nor taken off the driver's face in a preceding predetermined period. FIG. 4B illustrates an example of detection of the reference direction and the reference position for the case that putting a wearable object on or taking a wearable object off the driver's face is detected in a preceding predetermined period. The abscissas in FIGS. 4A and 4B represent time.

In the example illustrated in FIG. 4A, neither putting a wearable object on the driver's face nor taking a wearable object off the driver's face is detected in a predetermined period P previous to current time t0. Hence the reference direction and the reference position of the driver's face are calculated, based on orientations and positions of the driver's face respectively detected from face images 401-1 to 401-n obtained in the predetermined period P.

In the example illustrated in FIG. 4B, putting a wearable object on the driver's face is detected at time t1 in the predetermined period P previous to current time t0. Hence the reference direction and the reference position of the driver's face are calculated, based on orientations and positions of the driver's face respectively detected from the face images 402-m to 402-n obtained after time t1, of the face images 402-1 to 402-n obtained in the predetermined period P. This enables the face-reference updating unit 33 to eliminate the effect on calculation of the reference direction and the reference position of the driver's face caused by putting a wearable object on or taking a wearable object off the driver's face.

Every time it updates the reference direction and the reference position of the driver's face, the face-reference updating unit 33 notifies the determining unit 34 of the updated reference direction and reference position of the driver's face.

The determining unit 34 compares the latest orientation and position of the driver's face with the reference direction and the reference position of the driver's face to determine whether the driver is in the state suitable for driving the vehicle 10.

For example, the determining unit 34 calculates the absolute value of the difference between the latest orientation and the reference direction of the driver's face, and compares the absolute value of this difference with a predetermined tolerable range of face orientations. When the absolute value of this difference is beyond the tolerable range of face orientations, the determining unit 34 determines that the driver is looking away, i.e., the driver is not in the state suitable for driving the vehicle 10. Similarly, the determining unit 34 calculates the absolute value of the difference between the latest position and the reference position of the driver's face, and compares the absolute value of this difference with a predetermined tolerable range of positions. When the absolute value of this difference is beyond the tolerable range of positions, the determining unit 34 determines that the driver is not in the state suitable for driving the vehicle 10.

As described above, the driver may look other than ahead of the vehicle 10 to check the situation around the vehicle 10. However, even in such a case, the driver will not continue looking other than ahead of the vehicle 10 as long as the driver is concentrating on driving the vehicle 10. In view of this, according to a modified example, the determining unit 34 may determine that the driver is not in the state suitable for driving the vehicle 10, in the case that the absolute value of the difference between the orientation and the reference direction of the driver's face has been beyond the tolerable range of face orientations for a predetermined time (e.g., several seconds) or longer. Similarly, the determining unit 34 may determine that the driver is not in the state suitable for driving the vehicle 10, in the case that the absolute value of the difference between the position and the reference position of the driver's face has been beyond the tolerable range of positions for a predetermined time or longer.

When it is determined that the driver is not in the state suitable for driving the vehicle 10, the determining unit 34 generates warning information including a warning message to warn the driver to look ahead of the vehicle 10. The determining unit 34 then outputs the generated warning information to the user interface 3 via the communication interface 21, causing the user interface 3 to display the warning message or a speaker included in the user interface 3 to output a voice to warn the driver to look ahead of the vehicle 10.

FIG. 5 is an operation flowchart of the driver monitoring process executed by the processor 23. The processor 23 may execute the driver monitoring process in accordance with the following operation flowchart at predetermined intervals, e.g., at each acquisition of a face image.

The face-orientation detecting unit 31 of the processor 23 detects the orientation and the position of the face of the driver of the vehicle 10, based on a face image obtained by the driver monitoring camera 2 (step S101). The on-off detecting unit 32 of the processor 23 determines whether putting a wearable object on or taking a wearable object off the driver's face is detected (step S102).

When putting a wearable object on or taking a wearable object off the driver's face is detected in step S102 (Yes in Step S102), the face-reference updating unit 33 resets the reference direction and the reference position of the face (step S103).

When neither putting a wearable object on the driver's face nor taking a wearable object off the driver's face is detected (No in Step S102) or after step S103, the face-reference updating unit 33 of the processor 23 updates the reference direction of the driver's face so that the average of orientations of the driver's face respectively detected from face images obtained in a preceding predetermined period after detection of previous putting on or taking off a wearable object will be the reference direction (step S104). The face-reference updating unit 33 also updates the reference position of the driver's face so that the average of positions of the driver's face respectively detected from the face images obtained in the predetermined period after detection of previous putting on or taking off a wearable object will be the reference position (step S105).

After update of the reference direction and the reference position, the determining unit 34 of the processor 23 compares the latest orientation and position of the driver's face with the reference direction and the reference position of the driver's face to determine the driver's state (step S106). Then, the processor 23 terminates the driver monitoring process. Immediately after resetting the reference direction and the reference position of the face in step S103, the processor 23 may omit the processing of step S106 because the latest face orientation and face position are the same as the reference direction and the reference position.

As has been described above, the driver monitor updates the reference direction and the reference position of the driver's face, based on orientations and positions of the driver's face respectively detected from face images obtained in a preceding predetermined period. However, when putting a wearable object on or taking a wearable object off the driver's face is detected, the driver monitor temporarily resets the reference direction and the reference position of the face. More specifically, the driver monitor updates the reference direction and the reference position of the driver's face, based on orientations and positions of the driver's face respectively detected from one or more face images obtained after the detection of putting the wearable object on or taking the wearable object off the driver's face, among the face images obtained in the predetermined period. For this reason, the driver monitor can eliminate the effect on the reference direction and the reference position of the driver's face caused by deviation of a detected face orientation or face position due to putting a wearable object on or taking a wearable object off the driver's face. Thus, the driver monitor can correctly set the reference direction and the reference position of the driver's face even if a wearable object is put on or taken off the driver's face.

A driver may temporarily put a wearable object on the face and then take it off the face, or temporarily take off a wearable object which he/she is wearing on the face and then put it on again. In such a case, the reference direction and the reference position of the driver's face at taking off a wearable object temporarily put on the face are supposed to be closer to those before the wearable object is put on the driver's face than to those while the wearable object is worn. Similarly, the reference direction and the reference position of the driver's face at putting on a wearable object temporarily taken off the face are supposed to be closer to those while the wearable object was on the driver's face last time than to those while the wearable object is off.

In view of this, according to a modified example, when the on-off detecting unit 32 detects putting a wearable object on the driver's face, the face-reference updating unit 33 may store the reference direction and the reference position of the driver's face at this time (the first reference direction and first reference position) in the memory 22 before resetting the reference direction and the reference position of the driver's face. Then, when the on-off detecting unit 32 detects taking a wearable object off the driver's face, the face-reference updating unit 33 may read the reference direction and the reference position of the driver's face at detection of putting a wearable object on the driver's face (the first reference direction and first reference position) from the memory 22, and set them as the reference direction and the reference position of the driver's face at detection of taking off a wearable object. Similarly, when the on-off detecting unit 32 detects taking a wearable object off the driver's face, the face-reference updating unit 33 may store the reference direction and the reference position of the driver's face at this time (the second reference direction and second reference position) in the memory 22 before resetting the reference direction and the reference position of the driver's face. Then, when the on-off detecting unit 32 detects putting a wearable object on the driver's face, the face-reference updating unit 33 may read the reference direction and the reference position of the driver's face at detection of taking a wearable object off the driver's face (the second reference direction and second reference position) from the memory 22, and set them as the reference direction and the reference position of the driver's face at detection of putting on a wearable object. This enables the face-reference updating unit 33 to more correctly set the reference direction and the reference position of the driver's face at detection of putting a wearable object on or taking a wearable object off the driver's face.

When a wearable object is on the face, the accuracy of detection of face orientations and positions is lower and thus detected face orientations and positions vary more widely than when there is no wearable object. In view of this, according to another modified example, the face-reference updating unit 33 may extend the predetermined period used for updating the reference direction or the reference position for the case that a wearable object is on the driver's face longer than the predetermined period for the case that no wearable object is on the driver's face. Alternatively, the face-reference updating unit 33 may extend the tolerable range of orientations or positions of the driver's face, which is referred to when it updates the reference direction or the reference position, for the case that a wearable object is on the driver's face wider than the tolerable range for the case that no wearable object is on the driver's face. This enables the face-reference updating unit 33 to inhibit decrease in the accuracy of detection of the reference direction and the reference position of the face for the case that a wearable object is on the driver's face.

According to still another modified example, the face-reference updating unit 33 may store the difference between the reference direction or the reference position immediately before detection of putting on a wearable object and the orientation or the position of the face immediately after detection of putting on a wearable object in the memory 22 as an offset. Then, while the wearable object is on the face, the face-orientation detecting unit 31 may correct the detected face orientation or face position by subtracting the offset from the detected face orientation or face position. This enables the face-orientation detecting unit 31 to inhibit decrease in the accuracy of detection of the orientation and the position of the face for the case that a wearable object is on the face, regardless of deviation of the reference direction or the reference position of the face caused by the presence or absence of a wearable object, even if a wearable object is put on the driver's face during driving the vehicle 10.

According to yet another modified example, the determining unit 34 may determine the driver's state, based on the orientation or the position of the driver's face. In this case, the face-orientation detecting unit 31 may detect, of the orientation and the position of the driver's face, only the one used for determination of the driver's state. Similarly, the face-reference updating unit 33 may update, of the reference direction and the reference position of the driver's face, only the one used for determination of the driver's state.

The driver monitoring process according to the embodiment or modified examples may be applied to a vehicle control system for executing automated driving control of a vehicle on condition that the driver watches in the travel direction of the vehicle. In this case, for example, the processor 23 of the ECU 4 may detect an object around the vehicle 10 from an image obtained by a camera (not illustrated) mounted on the vehicle 10 to capture a region around the vehicle 10, and execute automated driving control of the vehicle 10 so that the vehicle 10 will not collide with the detected object. Then, while updating the reference direction or the reference position of the driver's face in accordance with the embodiment or modified examples, the processor 23 may compare the orientation or the position of the driver's face with the reference direction or the reference position to determine whether the driver is watching in the travel direction of the vehicle 10. In this case, the processor 23 may stop the automated driving control of the vehicle 10 to cause the driver to drive the vehicle 10, when it is determined that the driver is not watching in the travel direction of the vehicle 10 and the driver is not doing so even after the elapse of a certain period from warning the driver to watch in the travel direction of the vehicle 10 via the user interface 3.

A computer program for achieving the functions of the processor 23 of the ECU 4 according to the embodiment or modified examples may be provided in a form recorded on a computer-readable and portable medium, such as a semiconductor memory, a magnetic recording medium, or an optical recording medium.

As described above, those skilled in the art may make various modifications according to embodiments within the scope of the present invention.

What is claimed is:

1. A driver monitor comprising:
a memory; and
a processor configured to:
detect the orientation and the position of the face of a driver of a vehicle from each of time-series face images representing the driver's face, the face images being obtained by a camera for capturing the driver, the camera being mounted on the vehicle,
update a reference direction of orientations of the driver's face, based on orientations of the driver's face respectively detected from face images obtained in a preceding predetermined period among the time-series face images, or update a reference position of the driver's face, based on positions of the driver's face respectively detected from face images obtained in the predetermined period, and detect putting a wearable object on the driver's face or taking a wearable object off the driver's face in each of the time-series face images, wherein upon detection of putting on or taking off the wearable object, the processor is configured to update the reference direction, based on only orientations of the driver's face detected from face images obtained after the detection among the time-series face images, or update the reference position, based on only positions of the driver's face detected from face images obtained after the detection, and the processor is further configured to:

store, upon detection of putting on the wearable object, a first reference direction or a first reference position of the driver's face at detection of putting on the wearable object in the memory before resetting the reference direction or the reference position, and set, upon subsequent detection of taking off the wearable object, the first reference direction or the first reference position stored in the memory as the reference direction or the reference position of the driver's face at detection of taking off the wearable object.

2. A method for monitoring a driver, comprising:

detecting the orientation and the position of the face of a driver of a vehicle from each of time-series face images representing the driver's face, the face images being obtained by a camera for capturing the driver, the camera being mounted on the vehicle;

updating a reference direction of orientations of the driver's face, based on orientations of the driver's face respectively detected from face images obtained in a preceding predetermined period among the time-series face images, or updating a reference position of the driver's face, based on positions of the driver's face respectively detected from face images obtained in the predetermined period;

detecting putting a wearable object on the driver's face or taking a wearable object off the driver's face in each of the time-series face images, wherein the updating includes updating, upon detection of putting on or taking off the wearable object, the reference direction, based on only orientations of the driver's face detected from face images obtained after the detection among the time-series face images, or updating the reference position, based on only positions of the driver's face detected from face images obtained after the detection;

storing, upon detection of putting on the wearable object, a first reference direction or a first reference position of the driver's face at detection of putting on the wearable object in a memory before resetting the reference direction or the reference position; and setting, upon subsequent detection of taking off the wearable object, the first reference direction or the first reference position stored in the memory as the reference direction or the reference position of the driver's face at detection of taking off the wearable object.

3. A driver monitor comprising:

a processor configured to:

detect the orientation and the position of the face of a driver of a vehicle from each of time-series face images representing the driver's face, the face images being obtained by a camera for capturing the driver, the camera being mounted on the vehicle, update a reference direction of orientations of the driver's face, based on orientations of the driver's face respectively detected from face images obtained in a preceding predetermined period among the time-series face images, or update a reference position of the driver's face, based on positions of the driver's face respectively detected from face images obtained in the predetermined period, and detect putting a wearable object on the driver's face or taking a wearable object off the driver's face in each of the time-series face images; wherein:

upon detection of putting on or taking off the wearable object, the processor is configured to update the reference direction, based on only orientations of the driver's face detected from face images obtained after the detection among the time-series face images, or update the reference position, based on only positions of the driver's face detected from face images obtained after the detection, and the processor is further configured to:

exclude one or more face images for which an absolute value of a difference between: (i) a detected face orientation or a detected face position in the one or more face images and (ii) the updated reference direction or the updated reference position, respectively, is beyond a predetermined tolerable range, and again update the reference direction or the reference position based on the face images obtained after the detection except for the one or more face images that have been excluded.

4. A method for monitoring a driver, comprising:

detecting the orientation and the position of the face of a driver of a vehicle from each of time-series face images representing the driver's face, the face images being obtained by a camera for capturing the driver, the camera being mounted on the vehicle;

updating a reference direction of orientations of the driver's face, based on orientations of the driver's face respectively detected from face images obtained in a preceding predetermined period among the time-series face images, or updating a reference position of the driver's face, based on positions of the driver's face respectively detected from face images obtained in the predetermined period; and detecting putting a wearable object on the driver's face or taking a wearable object off the driver's face in each of the time-series face images, wherein the updating includes:

updating, upon detection of putting on or taking off the wearable object, the reference direction, based on only orientations of the driver's face detected from face images obtained after the detection among the time-series face images, or updating the reference position, based on only positions of the driver's face detected from face images obtained after the detection;

excluding one or more face images for which an absolute value of a difference between: (i) a detected face orientation or a detected face position in the one or more face images and (ii) the updated reference direction or the updated reference position, respectively, is beyond a predetermined tolerable range; and again updating the reference direction or the reference position based on the face images obtained after the detection except for the one or more face images that have been excluded.

\* \* \* \* \*